US012743375B2

(12) United States Patent
Watanabe et al.

(10) Patent No.: US 12,743,375 B2
(45) Date of Patent: Sep. 22, 2026

(54) MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yuichiro Watanabe, Yokohama Kanagawa (JP); Kazunori Matsuyama, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 50 days.

(21) Appl. No.: 19/046,601

(22) Filed: Feb. 6, 2025

(65) Prior Publication Data

US 2026/0072834 A1 Mar. 12, 2026

(30) Foreign Application Priority Data

Sep. 12, 2024 (JP) ................................ 2024-158116

(51) Int. Cl.
*G06F 12/06* (2006.01)
*G06F 16/22* (2019.01)

(52) U.S. Cl.
CPC ...... *G06F 12/0653* (2013.01); *G06F 16/2246* (2019.01)

(58) Field of Classification Search
CPC ......................... G06F 12/0653; G06F 16/2246
See application file for complete search history.

(56) References Cited

U.S. PATENT DOCUMENTS 6,567,862 B1 * 5/2003 Saito .................. H04N 21/2393 711/158
10,431,247 B2 10/2019 Kuribayashi et al.
2014/0258591 A1 * 9/2014 Dunn .................. G06F 12/0866 711/103
2018/0275876 A1 * 9/2018 Nakashima ............. G06F 3/061

FOREIGN PATENT DOCUMENTS

JP 2009087460 A 4/2009
JP 2019053809 A 4/2019

* cited by examiner

*Primary Examiner* — Francisco A Grullon
(74) *Attorney, Agent, or Firm* — Maier & Maier, PLLC

(57) ABSTRACT

A magnetic disk includes areas to which unique addresses are respectively assigned. A memory is configured to store unprocessed commands. A controller is configured to store, in the memory, a database of a tree-shaped structure. The structure includes a plurality of nodes respectively associated with a plurality of addresses respectively specified by a plurality of unprocessed commands. Two of the plurality of nodes are associated with each other. The controller is further configured to select, of the plurality of unprocessed commands, either a command associated with an address larger than and closest to a start address or a command associated with an address smaller than and closest to the start address as a candidate command to be executed next.

15 Claims, 11 Drawing Sheets

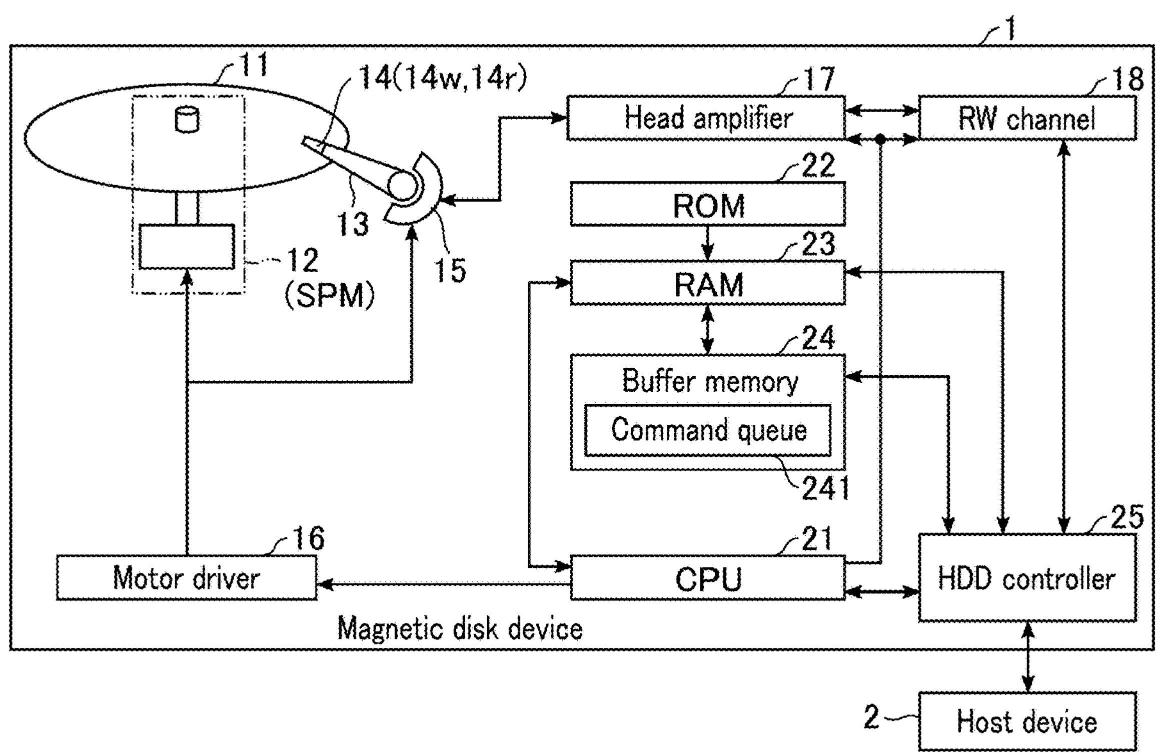
F I G. 1
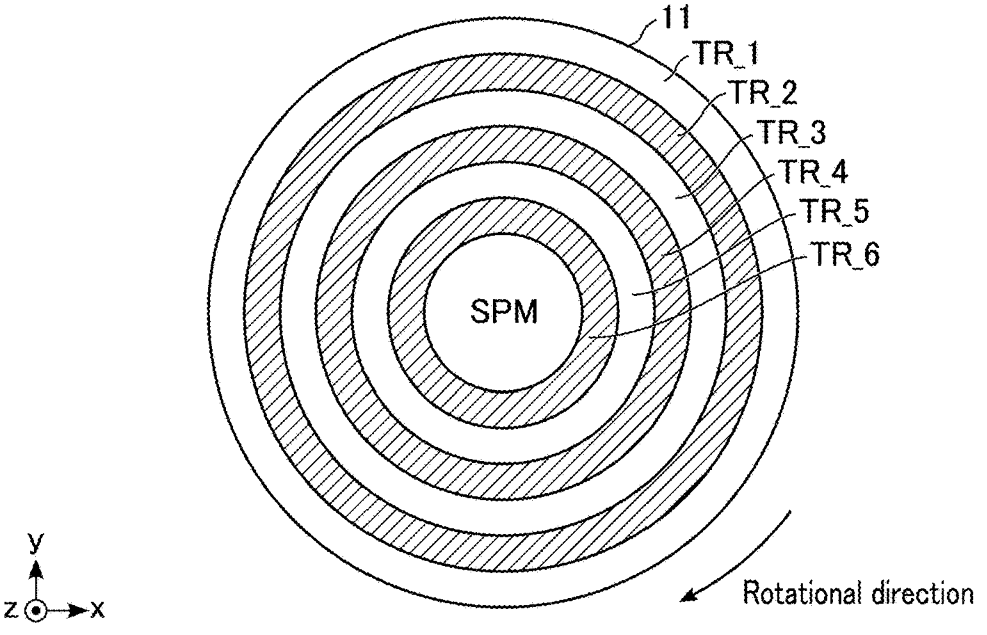
F I G. 2

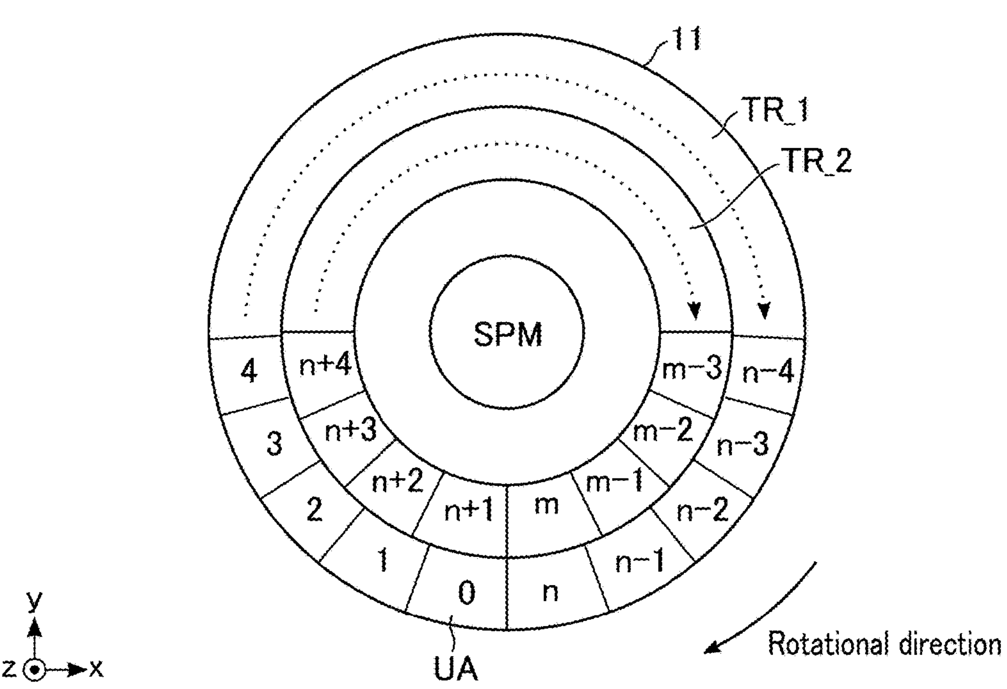
F I G. 3
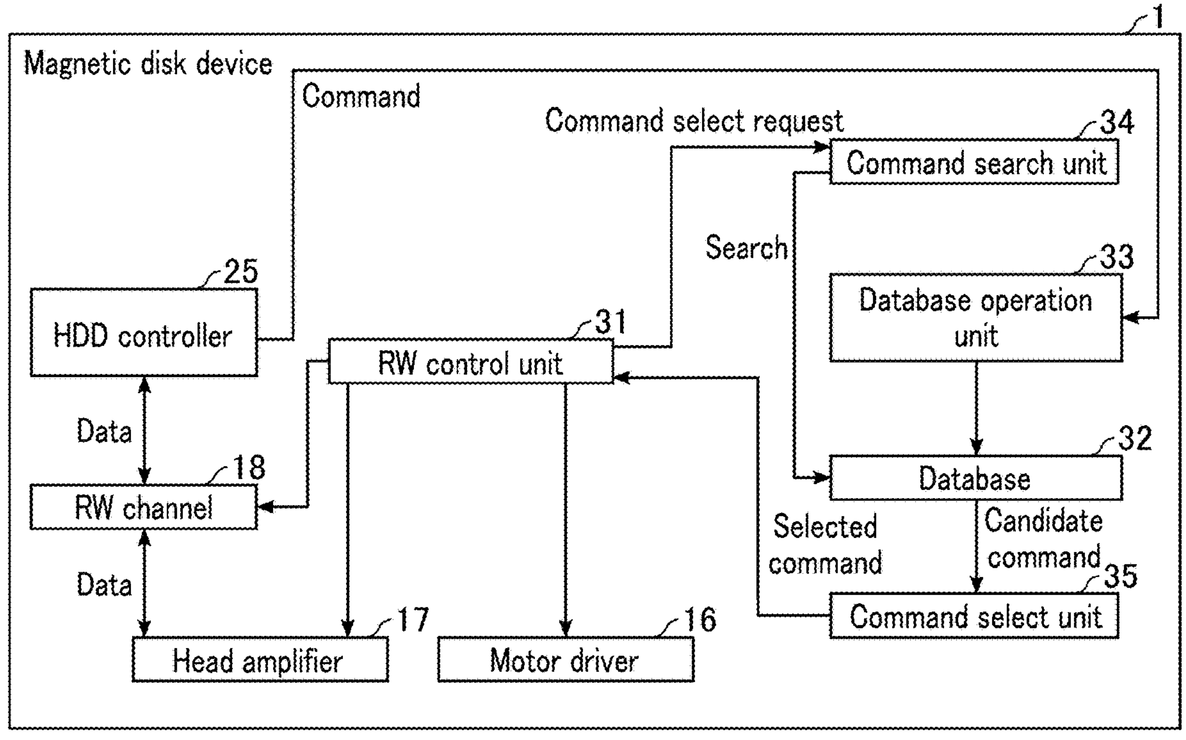
F I G. 4

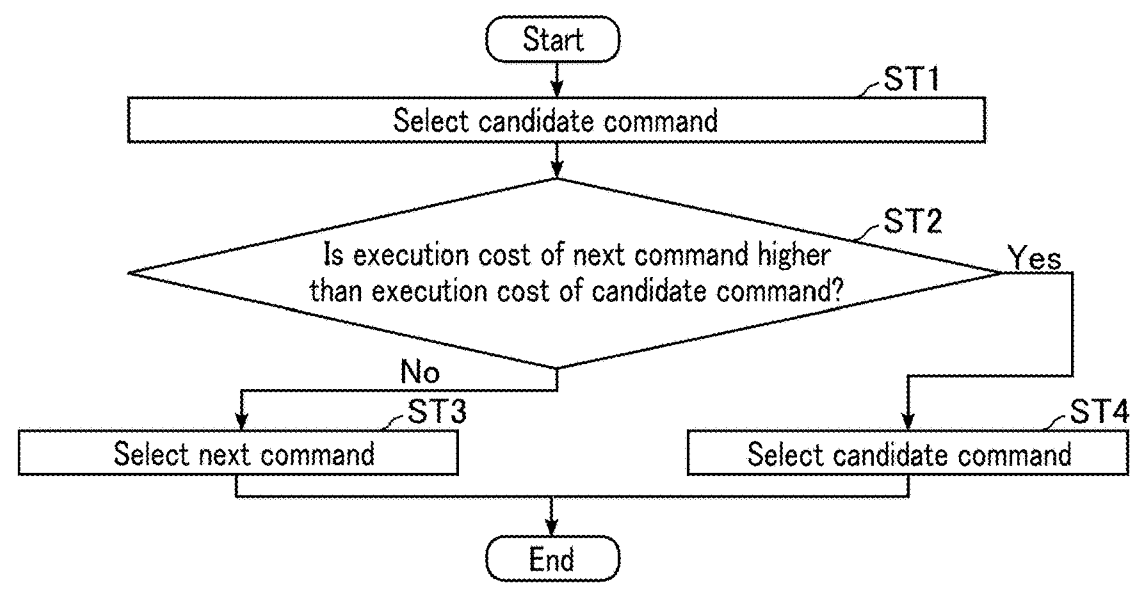
F I G. 9
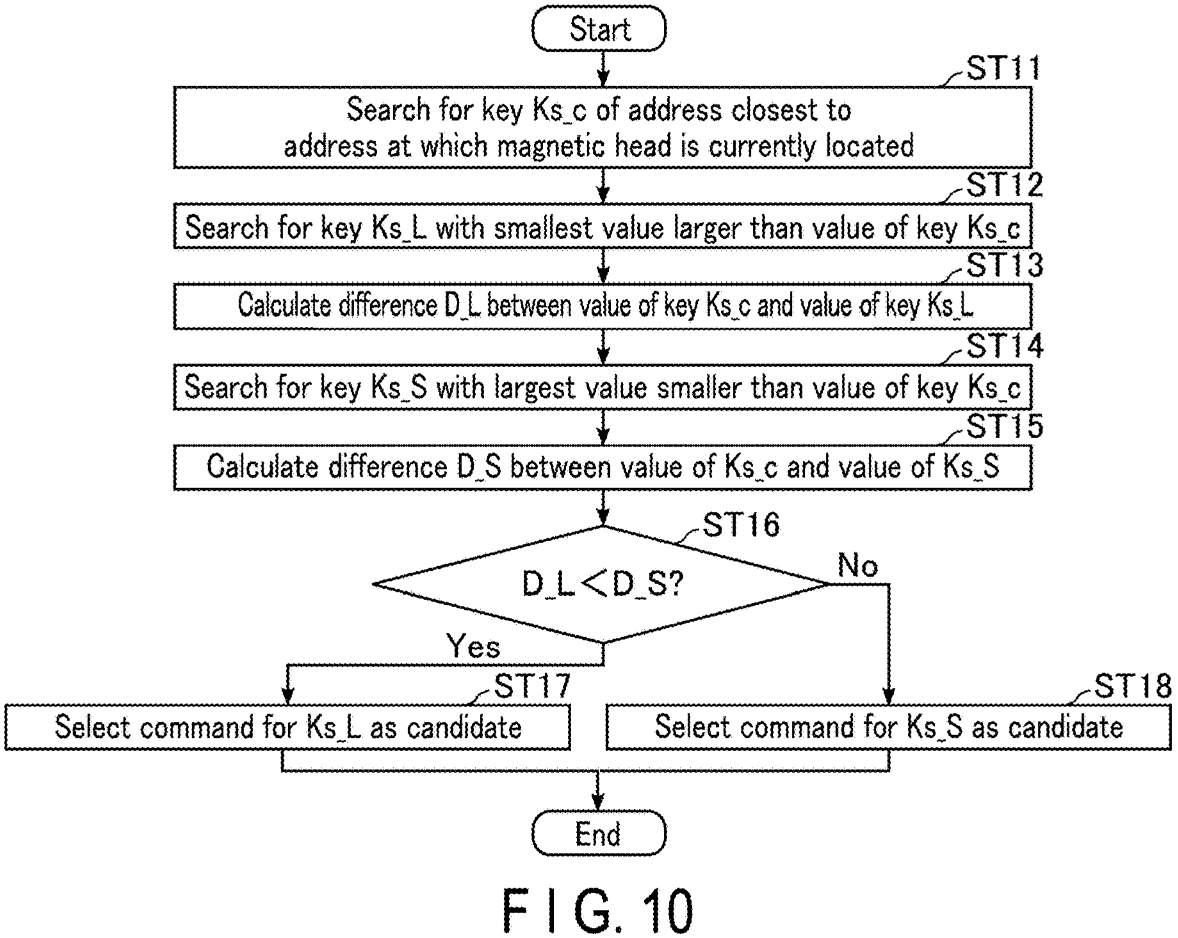
F I G. 10

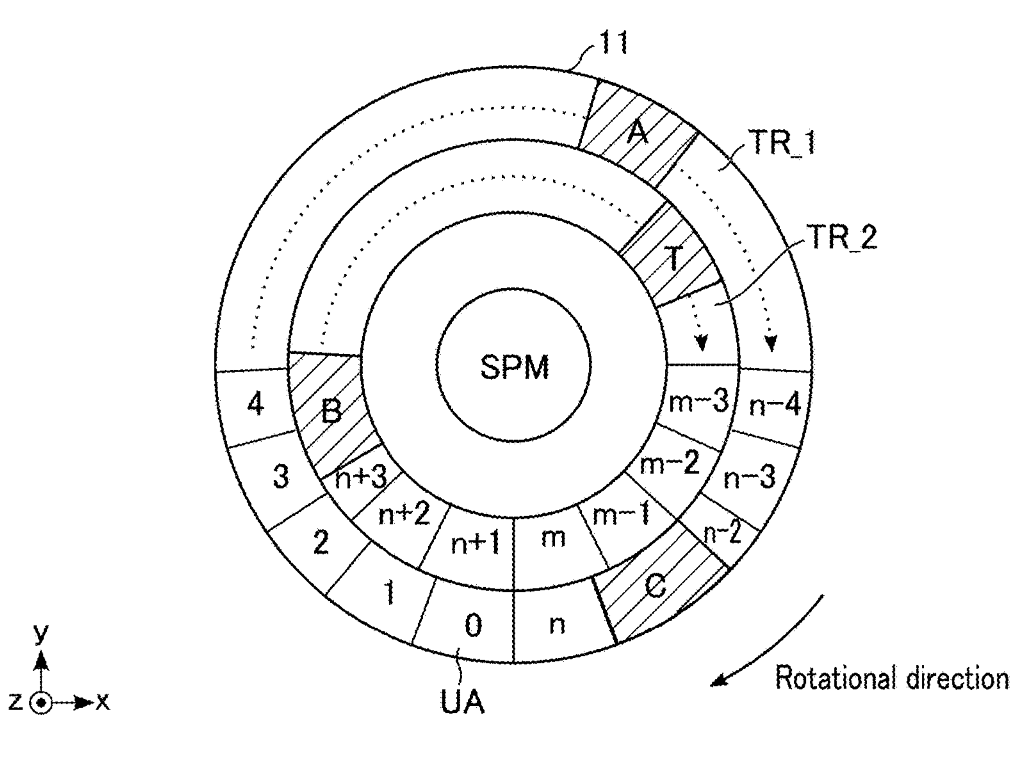
F I G. 11
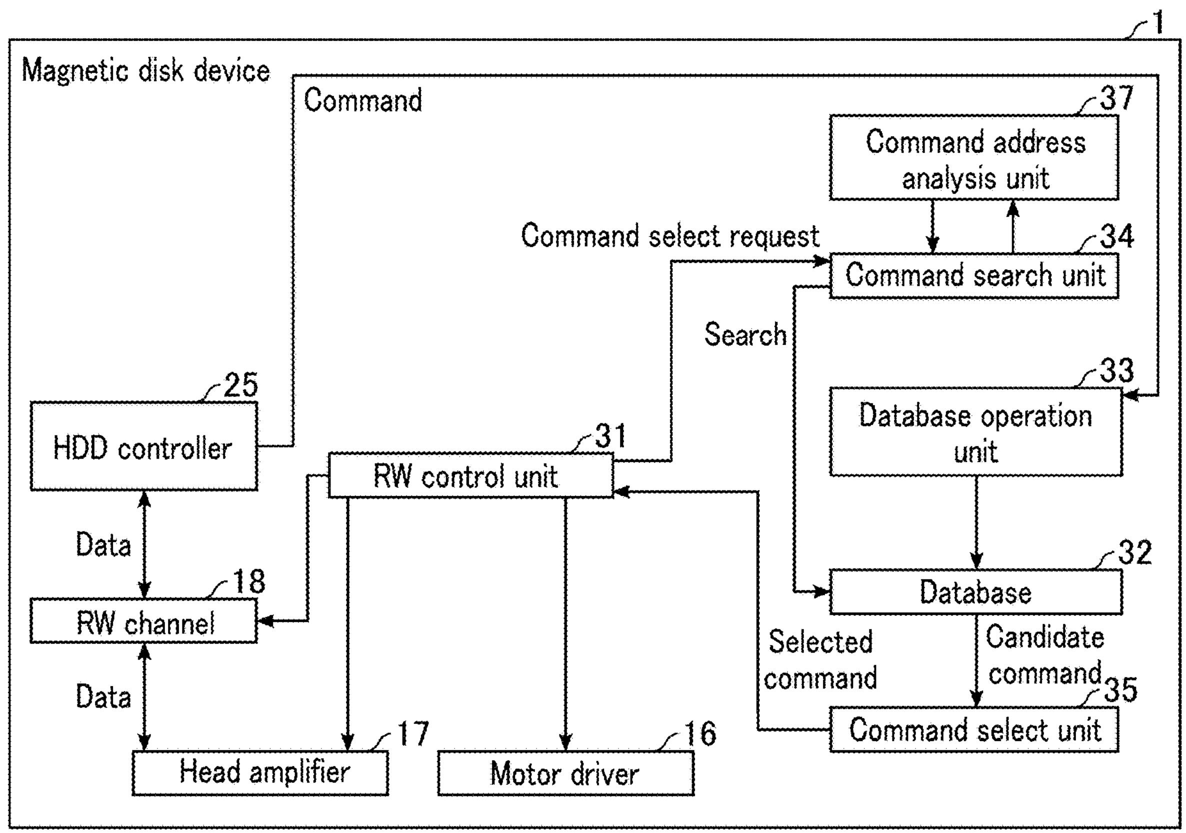
F I G. 12

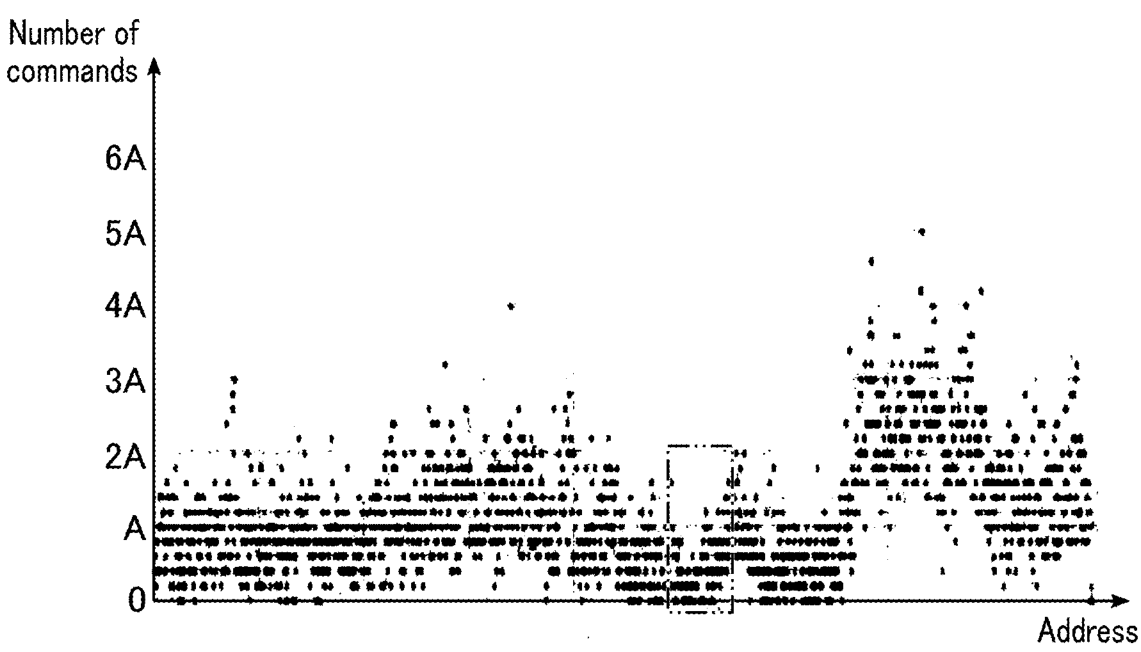
F I G. 13
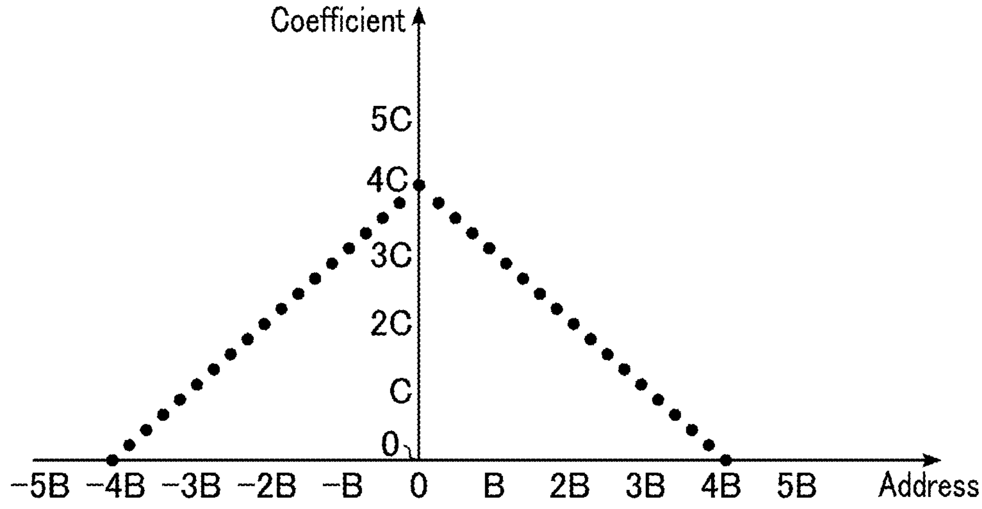
F I G. 14

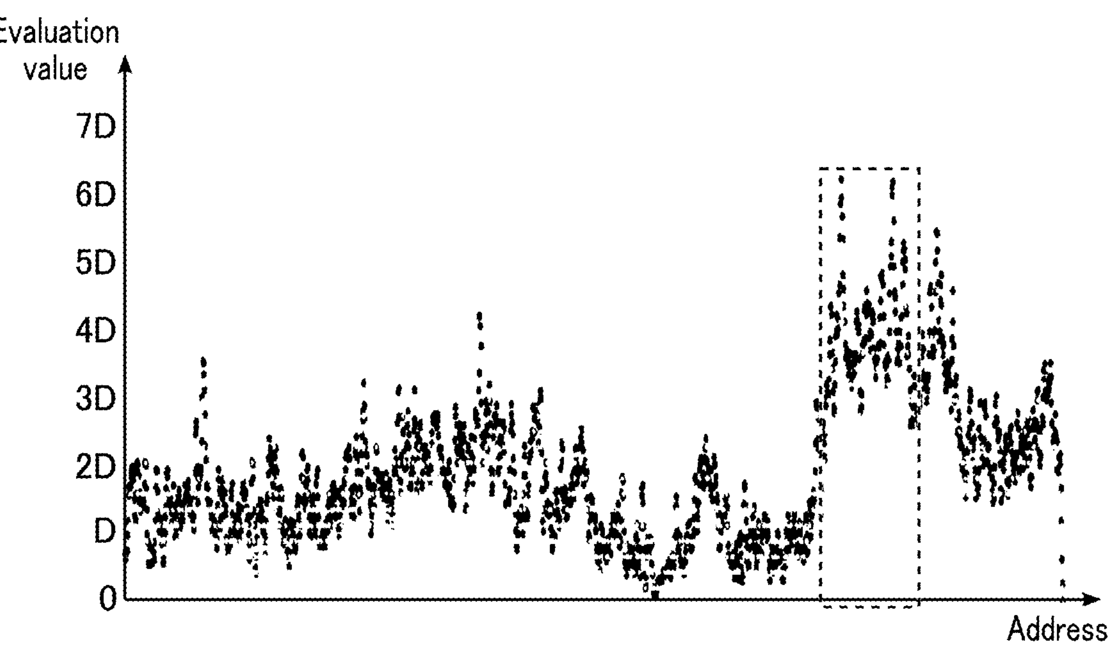
F I G. 15
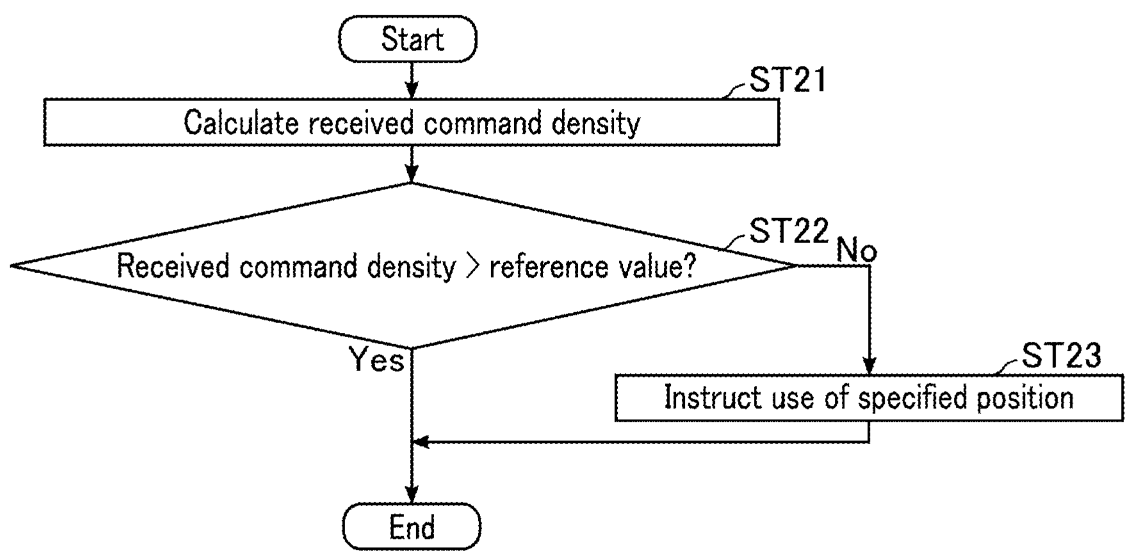
F I G. 16

MAGNETIC DISK DEVICE

CROSS-REFERENCE TO RELATED APPLICATION

This application is based upon and claims the benefit of priority from Japanese Patent Application No. 2024-158116, filed Sep. 12, 2024, the entire contents of which are incorporated herein by reference.

FIELD

Embodiments relate to a magnetic disk device.

BACKGROUND

Examples of the magnetic disk device include a hard disk drive (HDD). The magnetic disk device receives commands from outside even during writing and reading data to and from magnetic disks. The received commands may be managed in a queue, namely, in the order in which the commands are received, from the viewpoint of ensuring data consistency.

On the other hand, there is a demand for a magnetic disk device to efficiently perform data writing and reading for improved operation speed. For this purpose, there is a technique of selecting, as a command to be executed next, a command that instructs access to a closer area to an area currently being accessed on a magnetic disk. Such a technique is known as "reordering". To perform reordering, commands in a queue are searched. Searching of the commands may take time.

BRIEF DESCRIPTION OF THE DRAWINGS

FIG. 1 shows a hardware configuration of a magnetic disk device according to a first embodiment.

FIG. 2 shows an example of areas of a magnetic disk of the magnetic disk device according to the first embodiment.

FIG. 3 shows an example of addresses of the areas of the magnetic disk of the magnetic disk device according to the first embodiment.

FIG. 4 shows a functional configuration of the magnetic disk device according to the first embodiment.

FIG. 9 shows a flow of an operation of the magnetic disk device according to the first embodiment.

FIG. 10 shows a flow of an operation of the magnetic disk device according to the first embodiment.

FIG. 11 shows an example of execution costs of the magnetic disk device according to the first embodiment at a certain point in time.

FIG. 12 shows a functional configuration of a magnetic disk device according to a second embodiment.

FIG. 13 shows an example of data obtained in the magnetic disk device according to the second embodiment.

FIG. 14 shows an example of a filter used in the magnetic disk device according to the second embodiment.

FIG. 15 shows an example of data obtained in the magnetic disk device according to the second embodiment.

FIG. 16 shows a flow of an operation of the magnetic disk device according to the second embodiment.

DETAILED DESCRIPTION

Figure 5:
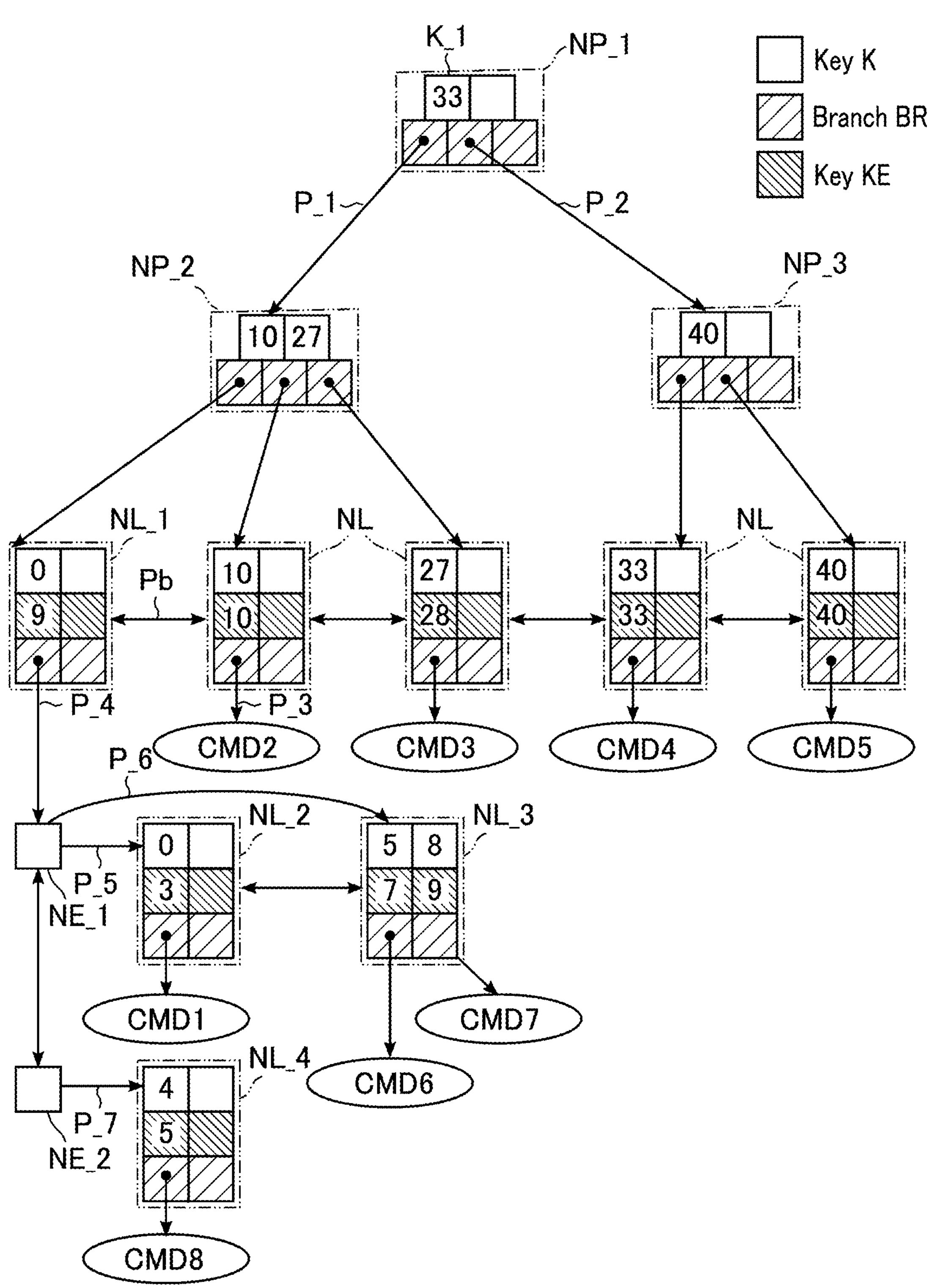
FIG. 5 shows an example of a data structure used in the magnetic disk device according to the first embodiment.

In one embodiment, a magnetic disk device includes a magnetic disk including a plurality of areas to which unique addresses are respectively assigned, a memory configured to store a plurality of unprocessed commands, and a controller. The controller is configured to store, in the memory, a database of a tree-shaped structure. The structure includes a plurality of nodes respectively associated with a plurality of addresses respectively specified by a plurality of unprocessed commands. Two of the plurality of nodes are associated with each other. The controller is further configured to select, of the plurality of unprocessed commands, either a command associated with an address larger than and closest to a start address or a command associated with an address smaller than and closest to the start address as a candidate command to be executed next.

Embodiments will now be described with reference to the figures. For an embodiment subsequent to an embodiment that has already been described, the description will concentrate mainly on the matters that constitute a difference from the already described embodiment. The entire description of a particular embodiment applies to another embodiment unless an explicit mention is made otherwise, or an obvious elimination is involved.

1. First Embodiment

FIG. 1 shows a hardware configuration of a magnetic disk device according to a first embodiment. The magnetic disk device 1 is a device configured to store data based on a magnetization of a magnetic material. The magnetic disk device 1 communicates with a host device 2 in accordance with a communication standard based on a given protocol. Examples of the host device 2 include a personal computer. The magnetic disk device 1 is connected to the host device 2 via wiring that is based on a communication standard with which the magnetic disk device complies. Examples of the communication system include Serial Advanced Technology Attachment (SATA). The magnetic disk device 1 receives a command from the host device 2, and operates based on the command. The magnetic disk device 1 stores data supplied from the host device 2 based on the command. Also, the magnetic disk device 1 transmits, based on the command, the data stored in the magnetic disk device 1 to the host device 2.

As shown in FIG. 1, the magnetic disk device 1 includes components such as a magnetic disk 11, a spindle motor 12, an arm 13, a magnetic head 14, a voice coil motor 15, a motor driver 16, a head amplifier 17, an RW channel 18, a CPU 21, a ROM 22, a RAM 23, a buffer memory 24, and an HDD controller 25.

The magnetic disk 11 is a disk-shaped storage medium configured to store data. The magnetic disk 11 is configured to store data on a recording surface using a magnetic material. The magnetic disk device 1 may include two or more magnetic disks 11.

The spindle motor 12 is a device configured to rotate the magnetic disk 11. The spindle motor 12 includes a rotation axis and a driver. The spindle motor 12 holds the magnetic disk 11 by the rotation axis. The rotation axis is connected to the center of the magnetic disk 11, and rotates to allow the magnetic disk 11 to rotate around the rotation axis. The driver drives the rotation axis to rotate the rotation axis.

The arm 13 is a member configured to hold the magnetic head 14. The arm 13 has a rod-like shape and holds the magnetic head 14 at its distal end.

The magnetic head 14 is a component for writing and reading data to and from the magnetic disk 11. The magnetic head 14 is attached to a distal end of the arm 13. The magnetic head 14 contains a magnetic material. The magnetic head 14 is located at a position slightly distanced from the recording surface of the magnetic disk 11 by the arm 13. The magnetic head 14 includes a write element 14*w* and a read element 14*r*.

The write element 14*w* writes write data by changing a state of a magnetization of a data write target area in the magnetic disk 11. The write data is data to be stored in the write target area. The write element 14*w* receives a write current, and changes a magnetization of the write target area based on the write current.

The read element 14*r* generates a read signal based on data stored in a read target area, based on a magnetization state of the read element 14*r* and a magnetization state of the data read target area in the magnetic disk 11.

The voice coil motor 15 is a motor configured to mechanically drive the target to be driven by the voice coil motor 15 based on an electric signal. The voice coil motor 15 moves the arm 13 along a radial direction of the magnetic disk 11. The radial direction is a direction along a radius of the magnetic disk 11.

The motor driver 16 is a circuit configured to control driving by the spindle motor 12 and driving by the voice coil motor 15. The motor driver 16 receives the electric signal, and generates a control signal based on the received electric signal. The generated control signal contains information for controlling driving of the spindle motor 12 and information for controlling driving of the voice coil motor 15. The motor driver 16 is controlled by the CPU 21 which executes programs. In one example, the motor driver 16 has the form of an integrated circuit (IC) chip.

The head amplifier 17 is a circuit configured to execute a process for writing and reading data to and from the magnetic disk 11. The head amplifier 17 includes a read amplifier and a write driver. The read amplifier receives a read signal from the read element 14*r*, and amplifies a read signal. The write driver receives a signal based on write data stored in the magnetic disk 11, and generates a write current based on the received signal. The write current is supplied to the write element 14*w*. In one example, the head amplifier 17 has the form of an IC chip.

The RW channel 18 is a circuit configured to process a signal. The RW channel 18 receives write data from the HDD controller 25 or the buffer memory 24, modulates the write data (or converts the write data into an analogue format) to generate a signal based on the write data. The RW channel 18 supplies the generated signal to a write driver of the head amplifier 17. The RW channel 18 receives an amplified read signal from the head amplifier 17. The RW channel 18 demodulates the received read signal (or converts the received read signal into a digital format) to generate read data. The read data is supplied to the HDD controller 25 or the buffer memory 24.

The CPU 21 is an integrated circuit capable of executing various programs. Through execution of the programs, the CPU 21 controls and executes the entire operation of the magnetic disk device 1. With the programs (or firmware) stored in the ROM 22 and loaded on the RAM 23 being executed by the CPU 21, the magnetic disk device 1 executes various operations, and functions as various functional blocks to be discussed below. Also, the CPU 21 controls the motor driver 16 and the head amplifier 17 by executing the programs stored in the ROM 22 and loaded on the RAM 23.

The ROM 22 is a nonvolatile memory, and stores programs (or firmware) and control data for realizing some of the functions of the magnetic disk device 1 and for controlling the magnetic disk device 1.

The RAM 23 is a volatile memory, and temporarily stores data. The RAM 23 also functions as a work area of the CPU 21. Examples of the RAM 23 include a dynamic random access memory (DRAM) and a static random access memory (SRAM).

The buffer memory 24 is a semiconductor memory configured to temporarily store data, commands, etc. transmitted and received between the magnetic disk device 1 and the host device 2. Examples of the buffer memory 24 include a DRAM and an SRAM. The buffer memory 24 and the RAM 23 may be integrally formed. That is, a part of the storage area of the RAM 23 may be used as a buffer memory 24. The buffer memory 24 includes an area that functions as a command queue 241.

The command queue 241 temporarily stores commands received from the host device 2 by the magnetic disk device 1. The command queue 241 outputs the commands received by the magnetic disk device 1 in the order they are received. The commands include write commands and read commands. A write command specifies an area of the magnetic disk 11 into which data is to be written by a start address and a size. The magnetic disk device 1 transmits data stored in the magnetic disk device 1 to the host device 2 based on a read command. A read command specifies an area of the magnetic disk 11 from which data is to be read by a head address and a size. The command stored in the command queue 241 is an unprocessed (or unexecuted) command, and may be hereinafter referred to as an "unprocessed command".

The HDD controller 25 is an interface configured to control transmission and reception of signals between the magnetic disk device 1 and the host device 2. The HDD controller 25 includes a terminal (or a connector) for connection with wiring that allows communication with the circuit and the host device 2. The HDD controller 25 supplies write data received from the host device 2 to the buffer memory 24 and/or the RAM 23. The HDD controller 25 receives read data from the buffer memory 24 and/or the RAM 23, and transmits the read data to the host device 2. The HDD controller 25 supplies the command received from the host device 2 to the buffer memory 24. Some of the functions of the HDD controller 25 may be realized by execution of the programs loaded on the RAM 23 by the CPU 21.

FIG. 2 shows an example of areas of a magnetic disk of the magnetic disk device according to the first embodiment. As shown in FIG. 2, the magnetic disk 11 includes, on its recording surface, a plurality of tracks TR. FIG. 2 shows an example in which six tracks TR, namely, tracks TR_1, TR_2, TR_3, TR_4, TR_5, and TR_6 are provided. The tracks TR are circles with different radii. The tracks TR are concentric. In the example of FIG. 2, the tracks TR_1, TR_2, TR_3, TR_4, TR_5, and TR_6 are positioned farther from the center in this order. Two of the tracks TR are adjacent to each other.

In one example, the magnetic disk 11 rotates in a clockwise direction, which is one of two directions going along the circumference of the magnetic disk 11. Through rotation of the magnetic disk 11, the magnetic head 14 moves relative to the magnetic disk 11. The direction of rotation of the magnetic disk 11 may be referred to as a "rotational direction".

FIG. 3 shows an example of addresses of the areas of the magnetic disk of the magnetic disk device according to the first embodiment. As shown in FIG. 3, each track TR is further divided into a plurality of unit areas UA. The unit areas UA are configured to store data of the same size. Examples of the unit area UA include one or more sectors. Each unit area UA is assigned a unique address. Examples of the address include a logical block address (LBA). In one example, addresses are assigned in an ascending order to the unit areas UA arranged in a rotational direction in each track TR. That is, in the example of FIG. 3, the unit areas UA arranged in the rotational direction in the track TR_1 have addresses with increasing values, starting at 0 and ending at n, in the order arranged. Here, n is a positive integer. The unit areas UA arranged in the rotational direction in the track TR_2 have addresses with increasing values, starting at n+1 and ending at m, in the order arranged. Here, m is a positive integer larger than n+1. The same applies to the other tracks TR, such as the track TR_3. In FIG. 3, a servo area is omitted. The servo area is an area radially extending from the center of the magnetic disk 11, and is used for positioning of the magnetic head 14 relative to the magnetic disk 11, and is not used for data storage.

FIG. 4 shows a functional configuration (or functional blocks) of a magnetic disk device according to the first embodiment. The magnetic disk device 1 is, during operation, has functions to be executed by the functional blocks shown in FIG. 4 and to be described below. It is not essential that the functional blocks in each embodiment be distinguished as in the following example. Some of the functions may be executed by functional blocks different from the illustrated ones, and the functional blocks may be further divided into smaller functional sub-blocks.

As shown in FIG. 4, the magnetic disk device 1 includes a motor driver 16, a head amplifier 17, an RW channel 18, an HDD controller 25, an RW control unit 31, a database 32, a database operation unit 33, a command search unit 34, and a command select unit 35. In one example, the database 32 is realized by a memory space of the RAM 23. In one example, the database operation unit 33, the command search unit 34, and the command select unit 35 are realized by programs loaded on the RAM 23 from the ROM 22 being executed by the CPU 21.

The RW control unit 31 is a functional block configured to control the entire read and write of data in the magnetic disk device 1. The RW control unit 31 controls the motor driver 16 and the head amplifier 17 based on a read command or a write command being executed. The RW control unit 31 controls the RW channel 18 based on the read command or the write command. The RW control unit 31 also controls a reordering process. That is, the RW control unit 31 selects an unprocessed command that should be executed next for efficiency from among the unprocessed commands stored in the command queue 241, and executes the selected unprocessed command. The selection of the unprocessed commands will be described in detail later. The RW control unit 31 starts a reordering process under a given condition based on the program.

The database 32 is management data for managing unprocessed commands in the command queue 241.

The database operation unit 33 is a functional block configured to operate and update a database based on addition and deletion of commands to the command queue 241. In accordance with addition of an unprocessed command to the command queue 241, the database operation unit 33 adds data on the added unprocessed command to the database 32. In accordance with deletion of an unprocessed command from the command queue 241 as a result of its execution, the database operation unit 33 deletes data on the deleted command from the database 32.

The command search unit 34 is a functional block configured to search an unprocessed command that satisfies a condition using the database 32. The command search unit 34 receives a command select request from the RW control unit 31. The command select request requires selection of an unprocessed command based on a condition. The command search unit 34 causes an unprocessed command that has been found based on the specified condition to be output from the command queue 241 as a candidate command.

The command select unit 35 is a functional block configured to select a command to be executed next to the command currently being executed. Hereinafter, the command to be executed next to the command currently being executed may be referred to as a "next command". The command select unit 35 receives the candidate command. The command select unit 35 selects the latest next command based on a result of comparison between the candidate command and the current next command. The latest next command is received by the RW control unit 31. The RW control unit 31 executes a current next command after a new unprocessed command becomes executable.

One or more or all of the HDD controller 25, the RW control unit 31, the database operation unit 33, the command search unit 34, and the command select unit 35 may be regarded as a control unit or a controller.

FIG. 5 shows an example of a data structure used in the magnetic disk device according to the first embodiment. The data in the database 32 is structured in a format of an extended B+ tree. A B+ tree is a data structure widely used in the database field. FIG. 5 shows an example of a data structure in the database 32.

In the database 32, a plurality of nodes are structured in the form of a tree (or a hierarchy). The types of the nodes include leaf nodes NL and parent nodes NP. A leaf node NL is a node that may be associated with an unprocessed command CMD. A parent node NP is a node that is not associated with an unprocessed command CMD, and is located at a depth above the leaf node NL. The parent node NP may span over two or more layers.

Each parent node NP includes one or more keys K and two branches BR associated with each key K. In FIG. 5, the two branches BR are shown in the lower left and the lower right of each key K associated therewith. Each branch BR may include a pointer P. Of two pointers P associated with a first key K of a parent node NP, a lower-left pointer P has a value that refers to a parent node NP or a leaf node NL including a second key K with a value smaller than the value of the first key K. Of two pointers P associated with a first key K of a parent node NP, a lower-right pointer P has a value that refers to a parent node NP or the leaf node NL including a key K with a value equal to or greater than the value of the key K. If a parent node NP includes two keys K, a pointer P at the lower right of a one of the two keys K with a smaller value and a pointer P at the lower left of one of the two keys K with a larger value are common.

In the example of FIG. 5, a branch BR associated with the key K of "33" of the parent node NP_1 and located at the lower left of the key K of "33" includes a pointer P_1. The pointer P_1 refers to a parent node NP_2 including a key K with a value smaller than "33". A branch BR associated with the key K of “33” and located at the lower right of the key K of “33” includes a pointer P_2. The pointer P_2 refers to a parent node NP_3 including a key K with a value equal to or larger than “33”. In the example of FIG. 5, the parent node NP_2 has a key K of “10” and a key K of “27”, and the parent node NP_3 has a key K of “40”.

The leaf node NL further includes a key KE. Each leaf node NL includes the same number of keys KE as the number of keys K. Each key KE is associated with a single key K and a single branch BR. The branch BR may include a pointer P that refers to a single unprocessed command CMD, and may thus be associated with a single unprocessed command CMD. Accordingly, in a leaf node NL, a single key KE, a single key K, and a single pointer P (which, in turn, means an unprocessed command CMD referred to by the pointer P) are associated with one another. Each key K has, as a value, a start address specified by an unprocessed command CMD associated with the key K. A key KE has, as a value, an end address specified by the unprocessed command CMD associated with the key KE. An end address of a command is an address of a unit area UA including an end of an area specified by the command. As described above, a command CMD specifies a processing target area by its start address and size. It is thereby possible to know an end address from its start address and size.

In the example of FIG. 5, the key K of “10” and the key KE of “10” are associated with an unprocessed command CMD2 by the pointer P_3. The key K of “27” and the key KE of “28” may be associated with an unprocessed command CMD3. The key K of “33” and the key KE of “33” are associated with an unprocessed command CMD4. The key K of “40” and the key KE of “40” are associated with an unprocessed command CMD5.

Each leaf node NL is associated with one or two other leaf nodes NL by a pointer Pb. More specifically, a first leaf node NL is associated, by the pointer Pb, with a second leaf node NL including a key K with a smallest value that is equal to or larger than a largest value of the keys K included in the first leaf node NL. Also, the first leaf node NL is associated, by the pointer Pb, with a second leaf node NL including a key K with a largest value that is smaller than a smallest value of the keys K included in the first leaf node NL.

Each branch BR of the leaf node NL may include a pointer P that refers to an extension node NE. An extension node NE is generated together with a pointer P if, in the presence of a leaf node NL including a key K and a key KE, a command specifying an address equal to or larger than the value of the key K and equal to or smaller than the value of the key KE is received by the magnetic disk device 1. That is, an extension node NE referred to by a leaf node NL is generated after the leaf node NL in time. In the example of FIG. 5, a leaf node NL_1 includes a pointer P_4 to an extension node NE_1.

An extension node NE includes a pointer P to a leaf node NL including a key K with a value equal to or larger than the value of a key K and equal to or smaller than the value of the key KE included in a leaf node NL referring to the extension node NE. In the example of FIG. 5, the extension node NE_1 includes a pointer P_5 to the leaf node NL_2. The leaf node NL_2 includes a key K of “0” and a key KE of “3”, and includes a pointer to an unprocessed command CMD1 specifying addresses from “0” to “3”. In the example of FIG. 5, the extension node NE_1 further includes a pointer P_6 to a leaf node NL_3. The leaf node NL_3 includes a key K of “5” and a key KE of “7”, and includes a pointer to an unprocessed command CMD6 specifying addresses from “5” to “7”. The leaf node NL_3 further includes a key K of “8” and a key KE of “9”, and includes a pointer to an unprocessed command CMD7 specifying addresses from “8” to “9”.

As described above, the extension node NE referred to by a first leaf node NL is generated after generation of the first leaf node NL. The second leaf node NL referred to by the extension node NE is generated together with the extension node NE or after generation of the extension node NE. Accordingly, an unprocessed command CMD associated with the second leaf node NL referred to by the extension node NE is received after the unprocessed command CMD associated with the first leaf node NL referring to the extension node NE.

A further extension node NE is generated together with a pointer P if, in the presence of a leaf node NL referred to by an extension node NE and including a key K and a key KE, a command specifying an address equal to or larger than the value of the key K and equal to or smaller than the value of the key KE is received by the magnetic disk device 1. In the example of FIG. 5, in the presence of a leaf node NL_2 including a key K of “0” and a key KE of “3” and a leaf node NL_3 including a key K of “5” and a key KE of “7”, an unprocessed command CMD8 specifying “4” as a start address and “5” as an end address is received. Accordingly, based on the unprocessed command CMD8 being received, an extension node NE_2 referred to by the extension node NE_1 is generated. The extension node NE_2 refers to a leaf node NL_4 by a pointer P_7. The leaf node NL_4 includes a key K of “4” and a key KE of “5”. The key K of “4” of the leaf node NL_4 includes a pointer to a command CMD8 specifying “4” as a start address and “5” as an end address.

As described above, an unprocessed command (e.g., the unprocessed command CMD 8) associated with a leaf node NL referred to by a second extension node NE referred to by a first extension node NE is received after an unprocessed command (e.g., the unprocessed commands CMD6 and CMD7) associated with a leaf node NL referred to by the extension node NE.

If a further command CMD is received by the magnetic disk device 1 with unprocessed commands CMD stored in the command queue 241, the B+ tree of the database 32 is changed by the database operation unit 33. If the received command CMD specifies an address not partially overlapping an address specified by an unprocessed command CMD associated with a leaf node NL, the leaf node NL is added. The addition of the leaf node NL is the same as addition of a leaf node NL in a general B+ tree.

If an unprocessed command CMD stored in the command queue 241 is executed, the B+ tree of the database 32 is changed by the database operation unit 33. If the executed command CMD is associated with a leaf node NL not associated with an extension node NE, the leaf node NL is deleted. The deletion of the leaf node NL is the same as deletion of a leaf node NL in a general B+ tree.

Next, an example of addition of a leaf node NL and an extension node NE in the magnetic disk device 1 will be described with reference to FIGS. 5 to 7. Each of FIGS. 6 and 7 shows an example of a state of a database in the magnetic disk device according to the first embodiment.

Figure 6:
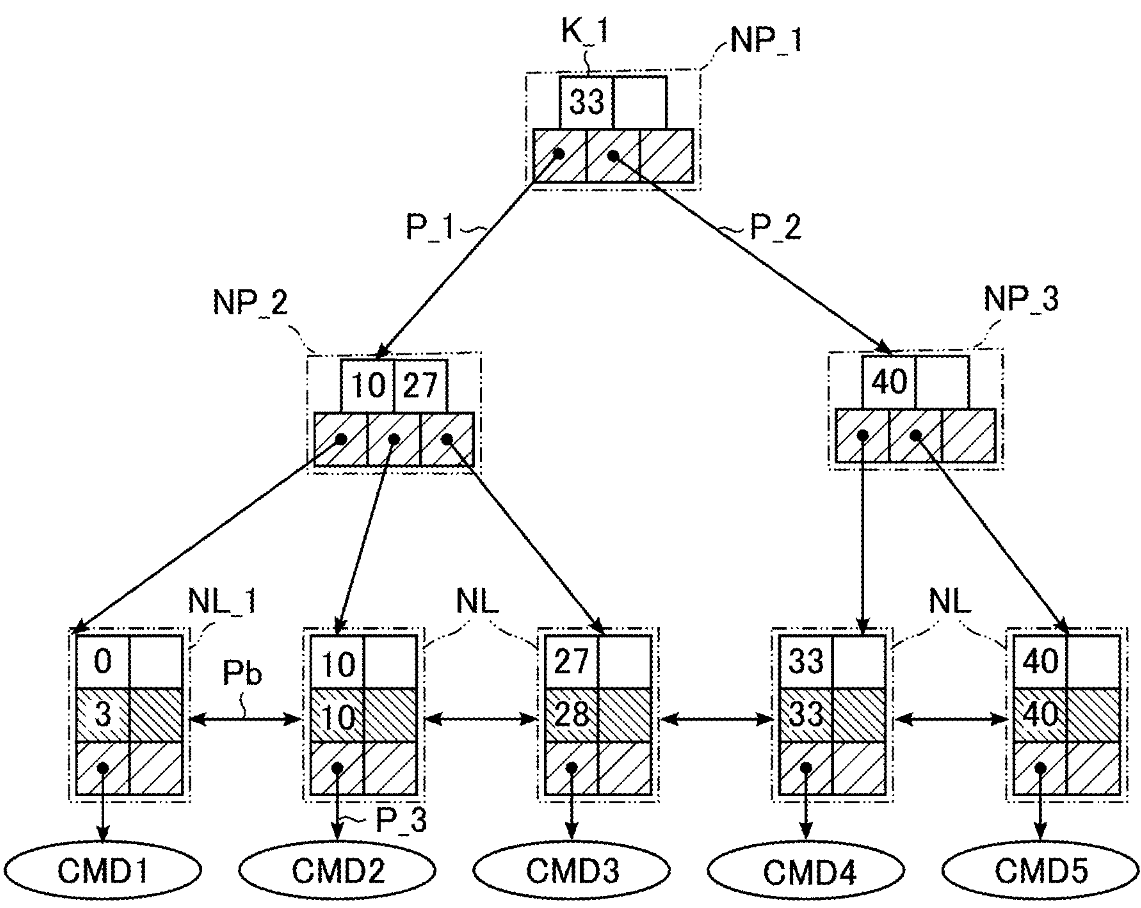
FIG. 6 shows an example of a state of a database in the magnetic disk device according to the first embodiment.

FIG. 6 shows a state prior to the state shown in FIG. 5, and differs from FIG. 5 in terms of the leaf nodes NL_2, NL3, and NL4 not having been generated and the configuration of the leaf node NL_1. Specifically, a leaf node NL_1 includes a key K of “0” and a key KE of “3”, and is associated with an unprocessed command CMD1 specifying “0” as a start address and “3” as an end address. It is assumed that, in the state shown in FIG. 6, unprocessed commands CMD6 and CMD7 are newly stored in a command queue 241. As described above with reference to FIG. 5, the unprocessed command CMD6 specifies “5” as a start address and “7” as an end address, and the unprocessed command CMD7 specifies “8” as a start address and “9” as an end address. The specified address ranges at least partially overlap the range from the start address denoted by the key K to the end address denoted by the key KE of the leaf node NL_1. Based thereon, the database 32 is changed to the state shown in FIG. 7.

That is, a pointer P_4 is generated from the leaf node NL_1 associated with the unprocessed command CMD1 specifying an address range that partially overlaps the address ranges specified by the unprocessed commands CMD6 and CMD7. The pointer P_4 refers to the extension node NE_1. Also, a pointer P_5 is generated from the extension node NE_1, and a leaf node NL_2 referred to by the pointer P_5 is generated. Also, a pointer P_6 is generated from the extension node NE_1, and a leaf node NL_3 referred to by the pointer P_6 is generated. As described above with reference to FIG. 5, the leaf node NL_2 includes a key K of “0”, a key KE of “3”, and a pointer to the unprocessed command CMD1 specifying “0” as a start address and “3” as an end address. The leaf node NL_3 includes a key K of “5”, a key KE of “7”, and a pointer to the unprocessed command CMD6 specifying “5” as an end address and “7” as an end address. The leaf node NL3 further includes a key K of “8”, a key KE of “9”, and a pointer to the unprocessed command CMD7 specifying “8” as a start address and “9” as an end address.

Figure 7:
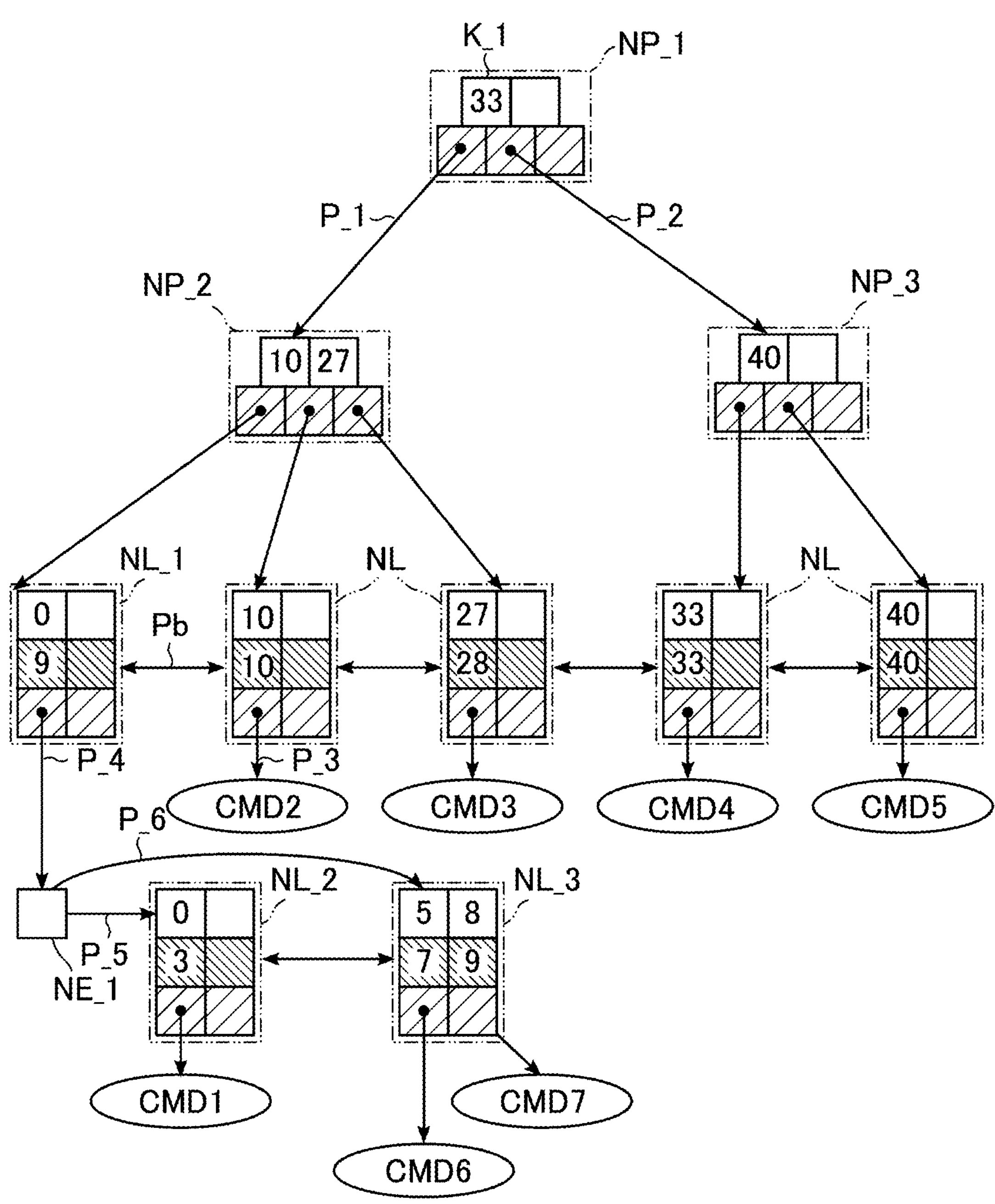
FIG. 7 shows an example of a state of a database in the magnetic disk device according to the first embodiment.

It is assumed that, in the state shown in FIG. 7, a command CMD8 is stored in the command queue 241. As described above with reference to FIG. 5, the unprocessed command CMD8 specifies “4” as a start address and “5” as an end address. The specified address range at least partially overlaps the range from the start address denoted by the key K to the end address denoted by the key KE of the leaf node NL_1. Moreover, the specified address range at least partially overlaps the range from the start address denoted by the key K to the end address denoted by the key KE of the leaf node NL_3. Based thereon, the database 32 is changed to the state shown in FIG. 5.

That is, an extension node NE_2 referred to by a pointer is generated from the extension node NE_1 referring to the leaf node NL_1 associated with the unprocessed command CMD1 specifying an address range partially overlapping the address range specified by the unprocessed command CMD8. Also, a pointer P_7 is generated from the extension node NE_2, and a leaf node NL_4 referred to by the pointer P_7 is generated. As described above with reference to FIG. 5, the leaf node NL_4 includes a key K of “4”, a key KE of “5”, and a pointer to the unprocessed command CMD8 specifying “4” as a start address and “5” as an end address.

An unprocessed command CMD associated with a leaf node NL at an upper depth is executed with a higher priority. Accordingly, even if two or more unprocessed commands CMD specifying the same start address are stored in the command queue 241, an unprocessed command CMD received earlier is promised to be executed earlier. That is, in the example of FIG. 5, the address “5” is specified by both of the unprocessed commands CMD6 and CMD8. However, an unprocessed command CMD associated with a leaf node NL located at an upper depth is executed earlier. In the example of FIG. 5, an unprocessed command CMD6 is executed earlier than the unprocessed command CMD8. It is thereby possible, even if commands CMD specifying the same address are continuously received, to execute these commands CMD in the order received. This ensures data consistency.

Figure 8:
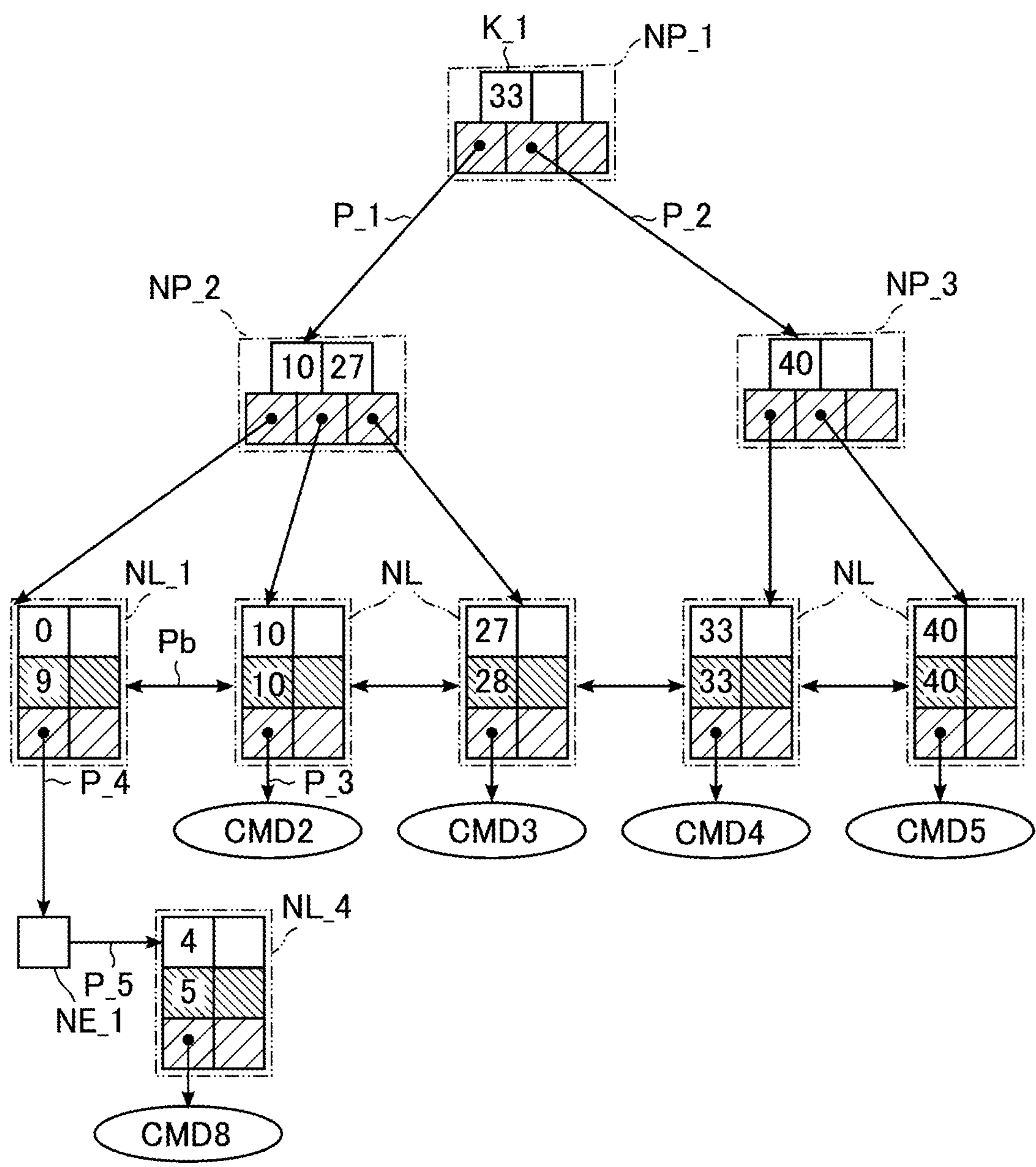
FIG. 8 shows an example of a state of a database in the magnetic disk device according to the first embodiment.

An example of deletion of a leaf node NL and an extension node NE in the magnetic disk device 1 will be described with reference to FIGS. 8 and 6. FIG. 8 shows an example of a state of a database in the magnetic disk device according to the first embodiment.

FIG. 8 shows a state subsequent to FIG. 5. If the unprocessed command CMD1 is executed in the state shown in FIG. 5, the leaf node NL_2 is deleted, and the pointer P_5 is changed to refer to the leaf node NL_3. If the unprocessed command CMD6 or CMD7 is executed in the state shown in FIG. 5, the key K, the key KE, and the pointer P associated with the executed unprocessed command CMD are deleted. The leaf node NL_3 is deleted if the unprocessed command CMD7 is executed after execution of the unprocessed command CMD6, or if the unprocessed command CMD6 is executed after execution of the unprocessed command CMD7.

It is assumed that the unprocessed commands CMD1, CMD6, and CMD7 are executed in a given order from the state shown in FIG. 5. In this case, the leaf nodes NL_2 and NL_3 are deleted. If one of the leaf nodes NL_2 and NL_3 is deleted after deletion of the other one, there will be no leaf nodes NL referred to by the extension node NE_1. Based thereon, all the leaf nodes NL at a depth below the extension node NE_1 are shifted one layer above. That is, in the example of FIG. 8, the leaf node NL_4 moves to a layer referred to by the extension node NE_1. Specifically, the pointer P_5 is changed to refer to the leaf node NL_4. In accordance with this change, no leaf node NL is referred to by the extension node NE_2. Based thereon, the extension node NE_2 is deleted. Specifically, if the unprocessed command CMD8 is executed in the state shown in FIG. 8, the extension node NE_1 and the leaf node NL_4 are deleted.

FIG. 9 shows a flow of an operation of the magnetic disk device according to the first embodiment. The flow of FIG. 9 starts if a process for determining a command that should be executed next to the command currently being executed for efficiency is started by the RW control unit 31 as a part of a reordering process. More specifically, the flow of FIG. 9 starts if the RW control unit 31 transmits a command select request to the command search unit 34 as a part of a reordering process.

As shown in FIG. 9, the command search unit 34 selects, upon receiving a command select request, a candidate command (step ST1). The candidate command is an unprocessed command to be compared with a current (or provisional) next command to determine a next command that leads to more efficient execution. Details of selection of the candidate command will be described later with reference to FIG. 10. The candidate command is received by the command select unit 35.

The command select unit 35 compares, upon receiving the candidate command, an execution cost of a current next command and an execution cost of the candidate command. The execution costs may be calculated by any method. An execution cost is, for example, a time required to move from the current position of the magnetic head 14 to a start address specified by a command that is a target for calculating the execution cost. The shorter the time, the lower the execution cost. A detailed example of calculating an execution cost will be described with reference to FIG. 11. If an execution cost of the next command is lower than an execution cost of the candidate command (step ST2_No), the command select unit 35 continues to select the current next command as the next command (step ST3).

If an execution cost of the next command is higher than an execution cost of the candidate command (step ST2_Yes), the command select unit 35 selects the candidate command as a new (or latest) next command (step ST4).

The flow of FIG. 9 is repeatedly performed for the duration of the reordering process. The next command at the end of the reordering process is executed if the magnetic disk device 1 is brought to a state in which a new unprocessed command can be executed next.

FIG. 10 shows a flow of an operation of the magnetic disk device according to the first embodiment. Specifically, FIG. 10 shows a subflow of selection of a candidate command in FIG. 9 (step ST1).

As shown in FIG. 10, the command search unit 34 searches for, from the database 32, a key K with a value closest to an address at which the magnetic head 14 is currently located on the magnetic disk 11 (step ST11). The value of a key K found by the search, referred to as "Ks_c", functions as a start position (a search start position) of a candidate command search.

The command search unit 34 searches for a key K with a smallest value larger than the value of the key Ks_c (a value closest to the key Ks_c) from the database 32 (step ST12). Step ST12 corresponds to searching addresses in ascending order of the addresses from the address with the value of the key Ks_c to search for an address closest to the address with the value of the key Ks_c. A key K found by the search is referred to as a "key Ks_L".

The command search unit 34 calculates a difference D_L between the value of the key Ks_c and the value of the key Ks_L (step ST13).

The command search unit 34 searches for, from the database 32, a key K with a largest value smaller than the value of the key Ks_c (a value closest to the key Ks_c) (step ST14). Step ST14 corresponds to searching addresses in descending order of the addresses from the address with the value of the key Ks_c to search for an address closest to the address with the value of the key Ks_c. A key K found by the search is referred to as "key Ks_S".

The command search unit 34 calculates a difference D_S between the value of the key Ks_c and the value of the key Ks_S (step ST15).

Steps ST12, ST13, ST14, and ST15 may be performed in any order as long as step ST13 is performed after step ST12 and step ST15 is performed after step ST14. In one example, a set of steps ST14 and ST15 is performed prior to the set of steps ST12 and ST13. In one example, a set of steps ST14 and ST15 may be performed (either of steps ST14 and ST15 may be performed earlier) after a set of steps ST12 and ST14 is performed (either of steps ST12 and ST14 may be performed earlier).

If the difference D_L is smaller than the difference D_S (step ST16_Yes), the command search unit 34 selects, as a candidate command, an unprocessed command that specifies the value of the key Ks_L as a start address (step ST17). The flow of FIG. 10 ends if step ST17 ends.

If the difference D_S is larger than the difference D_L (step ST16_Yes), the command search unit 34 selects, as a candidate command, an unprocessed command that specifies the value of the key Ks_S as a start address (step ST19). The flow of FIG. 10 ends if step ST17 ends.

If the differences D_S and D_L are the same, either of steps ST17 and ST18 may be performed.

FIG. 11 shows an example of execution costs of the magnetic disk device according to the first embodiment at a certain point in time. It is assumed that, as shown in FIG. 11, the magnetic head 14 is currently located at an address A of the magnetic disk 11. The address A denotes an area in an outermost track TR_1. The next command at the current stage is an unprocessed command C, which specifies an address C. The address C denotes an area in the track TR_1. The distance of the address C from the address A along a rotational direction of the magnetic disk 11 is smaller than that in a counter-rotational direction. The counter-rotational direction is opposite to the rotational direction.

It is assumed that an unprocessed command B is determined as a candidate command. The unprocessed command B specifies an address B. The address B denotes an area in the track TR_2 adjacent to the track TR_1 on an inner side of the track TR_1. The command select unit 35 determines, based on the positions of the addresses B and C, that a cost (an execution cost) for the magnetic head 14 to move from the current position to the address C is lower than a cost for the magnetic head 14 to move from the current position to the address B. Accordingly, the command select unit 35 maintains the unprocessed command C as the next command.

It is assumed that the unprocessed command T is subsequently determined as a candidate command. The unprocessed command T specifies an address T. The address T denotes an area in the track TR_2 that is very close to an area in contact with the area denoted by the address A in the track TR_2. The command select unit 35 determines, based on the positions of the addresses C and T, that a cost for the magnetic head 14 to move from the current position to the address T is lower than a cost for the magnetic head 14 to move from the current position to the address C. Accordingly, the unprocessed command T is selected as a new next command by the command select unit 35.

According to the first embodiment, it is possible to provide a magnetic disk device capable of operating at high speed, as described below.

Commands received by the magnetic disk device 1 can be stored in a queue, namely, accumulated as a linear list. In this case, in the case of searching unprocessed commands as a part of a reordering process, the search is performed in the order of unprocessed commands (i.e., the order in which they are received). Accordingly, even if an unprocessed command considered to be optimal is found at an initial stage of the search, it remains unclear whether the found unprocessed command is truly optimal until the linear list is searched to the end. Thus, it may take a long time to find a truly optimal unprocessed command. If all the unprocessed commands are to be searched along the linear list, there may be a case where the time given for the search ends in the course of the search. In this case, an optimal unprocessed command is not found.

The magnetic disk device 1 manages unprocessed commands in a structure of a B+ tree in which the values of start addresses specified by the unprocessed commands are used as keys K. With the B+ tree, nodes can be searched in the order of the values of their keys K (i.e., start addresses) in both forward and reverse directions of the values of the keys K. For selection of a candidate for a next command, a search is performed from a start address closest to an address at which the magnetic head 14 is currently located, and advances through addresses in both forward and reverse directions of the addresses. Of a start address found to be the closest in the forward direction and a start address found to be the closest in the reverse direction, whichever is closer is selected as a candidate command. It is thus possible to find a candidate command that specifies a closest address from the position of the current magnetic head 14 in a short period of time.

2. Second Embodiment

The second embodiment may be implemented in addition to the first embodiment. The second embodiment may be implemented independently of the first embodiment.

FIG. 12 shows a functional configuration (or functional blocks) of a magnetic disk device according to the second embodiment. As shown in FIG. 12, the magnetic disk device 1 further includes a command address analysis unit 37. The command address analysis unit 37 may be regarded as a part of the control unit.

The command address analysis unit 37 determines, based on a density of addresses specified by commands, a search start position for executing the next reordering process. The command address analysis unit 37 stores a command address distribution (or command address distribution data). The command address distribution denotes, with respect to each of the addresses specified by the commands (or received commands) that have been previously received by the magnetic disk device 1, the number of received commands that specify the addresses. In one example, the received commands are write commands and read commands that have been received since the magnetic disk device 1 had started operating upon receiving power supply. FIG. 13 shows an example of a command address distribution. The value A shown in FIG. 13 has a given magnitude.

The command address analysis unit 37 continues to store a range of addresses that have been searched in a reordering process. That is, a candidate command for a next command is repeatedly searched for in a reordering process with an address closest to an address at which the magnetic head 14 is currently located used as a search start position. Thereafter, an execution cost of a candidate command found in the search and an execution cost of a current next command are compared. The command address analysis unit 37 continues to store addresses specified by candidate commands for which execution costs have been compared with an execution cost of the next command. Thereby, an address range of candidate commands that have been found in the reordering process can be known at the completion of the reordering process.

The command address analysis unit 37 calculates a density (or a command density) of received commands falling in the address range of candidate commands from a command address distribution at the completion of a reordering process. If the command density is low, it can be determined that there is a small number of received commands in a range of addresses specified by candidate commands that have been found in a recently performed reordering process. In the example of FIG. 13, candidate commands are found over an address range enclosed by the dash-dotted line in a reordering process, and the number of received commands that specify addresses falling within the address range is 24A so far. The command density in this address range is lower than a reference value. Based thereon, the command address analysis unit 37 determines that the search start position in the next reordering process is to be determined from a range of addresses specified by a larger number of received commands, not based on the address at which the magnetic head 14 is located at the start of the reordering process.

The range of addresses specified by a larger number of commands can be determined using both a command address distribution and a filter. In one example, the command address analysis unit 37 uses a linear filter as shown in FIG. 14. The linear filter has a width over the range of the addresses, and has a maximum coefficient at the center of the address range. The linear filter has a coefficient that linearly decreases from the center toward both sides. The values B and C in FIG. 14 have any magnitude, and are expressed in any units.

FIG. 15 shows an example of a result of the filter shown in FIG. 14 applied to the command address distribution shown in FIG. 13. The value D shown in FIG. 15 has any magnitude. Through application of the filter, the number of received commands in the command address distribution is multiplied by a coefficient and thereby converted into an evaluation value. A received command has a larger evaluation value in a case where the received command is accompanied in a periphery with a larger number of received commands in an address range. An address range dense with high evaluation values is selected as the target for a search for the search start position in a next reordering process. In the example of FIG. 15, the address range enclosed by the dashed line is selected. An address at or in the vicinity of the center of the address range is used as a search start position in a next reordering process. Hereinafter, an address at or in the vicinity of the center of an address range may be referred to as a "dense-area address".

FIG. 16 shows a flow of an operation of the magnetic disk device according to the second embodiment. Specifically, FIG. 16 shows a flow of determination of the search start position in the next reordering process. The flow of FIG. 16 starts if a notification to end the reordering process is received by the command address analysis unit 37. In one example, the notification to end the reordering process is transmitted from the command search unit 34 or the RW control unit 31.

As shown in FIG. 16, the command address analysis unit 37 calculates, from the address range of candidate commands that have been found in the current reordering process, a received command density (or a density of candidate commands found in the address range) (step ST21).

If the received command density is higher than a reference value (step ST22_Yes), the flow of FIG. 16 ends.

If the received command density is equal to or lower than the reference value (step ST22_No), the command address analysis unit 37 instructs the RW control unit 31 to use a specified position (step ST23). The instruction to use the specified position is to instruct use of a dense-area address as a search start position at the start of a next reordering process. The flow of FIG. 16 ends if step ST23 ends.

Figure 17:
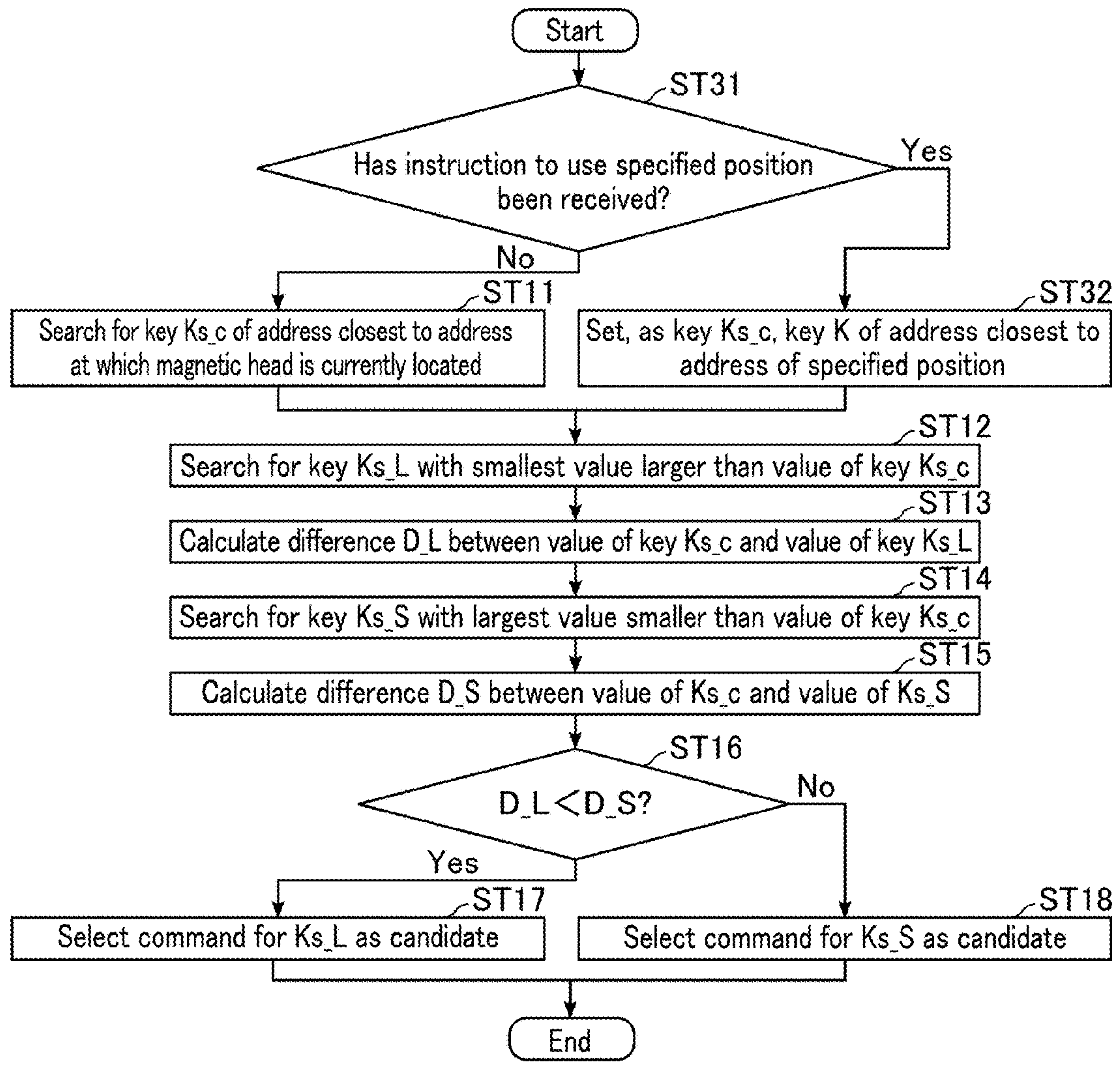
FIG. 17 shows a flow of an operation of the magnetic disk device according to the second embodiment.

FIG. 17 shows a flow of an operation of the magnetic disk device according to the second embodiment. Specifically, FIG. 17 shows a subflow of selection of a candidate command in FIG. 9 (step ST1).

As shown in FIG. 17, the command search unit 34 determines whether or not an instruction to use a specified position has been received (step ST31). If the instruction has not been received (step ST31_No), the flow shifts to step ST11. That is, the command search unit 34 searches for a candidate command using, as a search start position, an address closest to an address at which the magnetic head 14 is currently located. The flow at step ST11 and thereafter is the same as that in FIG. 10.

If the instruction has been received (step ST31_Yes), the command search unit 34 sets, as a key Ks_c, a key K with a value closest to an address of the specified position instructed to be used (step ST32). That is, the command search unit 34 searches for a candidate command using, as a search start position, an address closest to an address of the specified position. Step ST32 follows step ST12.

The magnetic disk device 1 according to the second embodiment calculates a density of received commands falling in an address range of candidate commands that have been found in a reordering process. If the command density is low, an address in an area with a high density of received commands is used as a search start position of the next reordering process. It is thereby possible to suppress biasing the range over which unprocessed commands are searched toward a specific range, and to efficiently find a candidate command.

In the case where the second embodiment is applied to the first embodiment, it is possible to find a candidate command efficiently, compared to the case where the first embodiment or the second embodiment is performed alone, as described below. That is, according to the first embodiment, it is possible to efficiently find an unprocessed command that specifies an address in the periphery of an address at which the magnetic head 14 is currently located. However, depending on an address specified by an unprocessed command, it is more efficient to process a plurality of unprocessed commands in an address range other than the periphery of the address of the current location. Accordingly, in the second embodiment, if a density of received commands falling in an address range of candidate commands is low, an address in an area with a high command density is used, instead of the address of the magnetic head 14 at the start of the next reordering process, as a search start position in a next reordering process. It is thereby possible to suppress biasing of the search start position, which could result in a very inefficient search.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device, comprising:

a magnetic disk including a plurality of areas to which unique addresses are respectively assigned;

a memory configured to store a plurality of unprocessed commands; and a controller configured to: store, in the memory, a database of a tree-shaped structure, the structure including a plurality of nodes respectively associated with a plurality of addresses respectively specified by a plurality of unprocessed commands, two of the plurality of nodes being associated with each other; and select, of the plurality of unprocessed commands, either a command associated with an address larger than and closest to a start address or a command associated with an address smaller than and closest to the start address as a candidate command to be executed next.

2. The magnetic disk device according to claim 1, wherein the plurality of nodes include a parent node, a first leaf node, and a second leaf node, the parent node includes a first key associated with a first address, a first pointer to a node with an address smaller than the first address, and a second pointer to a node with an address larger than the first address, the first leaf node is referred to by the first pointer, includes a second key associated with a second address, and is associated with a first command specifying the second address, and the second leaf node is referred to by the second pointer, includes a third key associated with a third address, and is associated with a second command specifying the third address.

3. The magnetic disk device according to claim 1, wherein the database includes a B+ tree structure of the plurality of nodes.

4. The magnetic disk device according to claim 1, wherein the controller is configured to select either the command associated with the address larger than and closest to the start address or the command associated with the address smaller than and closest to the start address, whichever is associated with an address closer to the start address, as the candidate command.

5. The magnetic disk device according to claim 4, wherein the plurality of nodes include a parent node, a first leaf node, and a second leaf node, the parent node includes a first key associated with a first address, a first pointer to a node with an address smaller than the first address, and a second pointer to a node with an address larger than the first address, the first leaf node is referred to by the first pointer, includes a second key associated with a second address, and is associated with a first command specifying the second address, and the second leaf node is referred to by the second pointer, includes a third key associated with a third address, and is associated with a second command specifying the third address.

6. The magnetic disk device according to claim 4, wherein the database includes a B+ tree structure of the plurality of nodes.

7. The magnetic disk device according to claim 4, wherein the controller is configured to select either a command to be executed next or the candidate command, whichever incurs a lower execution cost, as a latest command to be executed next.

8. The magnetic disk device according to claim 7, further comprising:

a magnetic head, wherein the start address is, of the plurality of addresses, an address closest to an address at which the magnetic head is located.

9. The magnetic disk device according to claim 7, wherein the start address is an address falling within an address range selected based on a density of received commands.

10. The magnetic disk device according to claim 7, wherein a selection of the candidate command and a comparison of an execution cost of the candidate command and an execution cost of a command to be executed next are repeatedly performed in a first reordering process of the plurality of unprocessed commands, a second reordering process for a plurality of unprocessed commands in the memory is performed after the first reordering process, a candidate command is searched for in the second reordering process using an address in an address range selected based on a density of received commands if a number of received commands in a first address range is below a first value, and the first address range includes addresses for a plurality of candidate commands for which execution costs have been compared with an execution cost of the command to be executed next in the first reordering process.

11. The magnetic disk device according to claim 7, wherein the plurality of nodes include a parent node, a first leaf node, and a second leaf node, the parent node includes a first key associated with a first address, a first pointer to a node with an address smaller than the first address, and a second pointer to a node with an address larger than the first address, the first leaf node is referred to by the first pointer, includes a second key associated with a second address, and is associated with a first command specifying the second address, and the second leaf node is referred to by the second pointer, includes a third key associated with a third address, and is associated with a second command specifying the third address.

12. The magnetic disk device according to claim 7, wherein the database includes a B+ tree structure of the plurality of nodes.

13. A magnetic disk device, comprising:

a magnetic disk including a plurality of areas to which unique addresses are respectively assigned;

a memory configured to store a plurality of unprocessed commands; and a controller configured to:

store, in the memory, a database of the plurality of unprocessed commands in the memory;

repeatedly perform, in each of a first reordering process and a second reordering process: a selection of a candidate command to be executed next from among the plurality of unprocessed commands in the memory; and a comparison of an execution cost of the candidate command and an execution cost of a command to be executed next; and search for, in the second reordering process, a candidate for a command to be executed next from among a plurality of unprocessed commands in the memory using an address in an address range selected based on a density of received commands if a number of received commands in a first address range is below a first value, wherein the first address range includes addresses for a plurality of candidate commands for which execution costs have been compared with an execution cost of the command to be executed next in the first reordering process.

14. The magnetic disk device according to claim 13, wherein the plurality of nodes include a parent node, a first leaf node, and a second leaf node, the parent node includes a first key associated with a first address, a first pointer to a node with an address smaller than the first address, and a second pointer to a node with an address larger than the first address, the first leaf node is referred to by the first pointer, includes a second key associated with a second address, and is associated with a first command specifying the second address, and the second leaf node is referred to by the second pointer, includes a third key associated with a third address, and is associated with a second command specifying the third address.

15. The magnetic disk device according to claim 13, wherein the database includes a B+ tree structure of the plurality of nodes.

* * * * *